US012772262B2

(12) United States Patent
Zhao et al.

(10) Patent No.: US 12,772,262 B2
(45) Date of Patent: Oct. 20, 2026

(54) USER EQUIPMENT AND METHOD FOR HANDLING SIDELINK (SL) DISCONTINUOUS RECEPTION (DRX) ROUND TRIP TIME (RTT) TIMER

(71) Applicant: SHARP KABUSHIKI KAISHA, Sakai City (JP)

(72) Inventors: Yinan Zhao, Shanghai (CN); Chao Luo, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 254 days.

(21) Appl. No.: 18/284,865

(22) PCT Filed: Mar. 30, 2022

(86) PCT No.: PCT/CN2022/083987

§ 371 (c)(1),
(2) Date: Sep. 29, 2023

(87) PCT Pub. No.: WO2022/206817

PCT Pub. Date: Oct. 6, 2022

(65) Prior Publication Data

US 2024/0196417 A1 Jun. 13, 2024

(30) Foreign Application Priority Data

Apr. 1, 2021 (CN) ......................... 202110359016.1

(51) Int. Cl.
*H04W 72/25* (2023.01)
*H04W 72/0446* (2023.01)
(Continued)

(52) U.S. Cl.
CPC ....... *H04W 72/25* (2023.01); *H04W 72/0446* (2013.01); *H04W 72/232* (2023.01);
(Continued)

(58) Field of Classification Search
CPC ..... H04W 72/25; H04W 72/40; H04W 76/28; H04W 72/232
See application file for complete search history.

(56) References Cited

U.S. PATENT DOCUMENTS

2021/0037468 A1 2/2021 Huang et al.
2023/0209644 A1* 6/2023 Han ...................... H04L 1/1848 370/328

(Continued)

FOREIGN PATENT DOCUMENTS

CN 101730206 A 6/2010
CN 112312526 A 2/2021
WO 2020/218892 A1 10/2020

OTHER PUBLICATIONS

R2-2008850, "Discussion on Sidelink DRX", Nov. 2-Nov. 13, 2020, pp. 1-3 (Year: 2020).*

(Continued)

*Primary Examiner* — Salvador E Rivas
(74) *Attorney, Agent, or Firm* — ScienBiziP, P.C.

(57) ABSTRACT

Provided in the present invention are a method performed by user equipment and user equipment. The method includes: receiving, from a higher layer, a request to determine a PSSCH/PSCCH transmission resource, determining, by the user equipment, a sidelink discontinuous reception active time, and determining, by the user equipment, a set of monitoring slots.

2 Claims, 4 Drawing Sheets

(51) Int. Cl.

| | |
|---|---|
| ***H04W 72/232*** | (2023.01) |
| ***H04W 72/40*** | (2023.01) |
| ***H04W 76/28*** | (2018.01) |
| *H04W 92/18* | (2009.01) |

(52) U.S. Cl.

CPC .......... *H04W 72/40* (2023.01); *H04W 76/28* (2018.02); *H04W 92/18* (2013.01)

(56) References Cited

U.S. PATENT DOCUMENTS

| | | | | |
|---|---|---|---|---|
| 2023/0239961 | A1* | 7/2023 | Lu | H04W 52/0216 370/311 |
| 2023/0262835 | A1* | 8/2023 | Li | H04W 76/28 |
| 2024/0114527 | A1* | 4/2024 | Zhao | H04W 72/25 |

OTHER PUBLICATIONS

R2-2100638, "Discussion on Sidelink DRX Timer", Jan. 25-Feb. 5, 2021, pp. 1-4 (Year: 2021).*

R2-2101207, "SL DRX with pre-indicated resources", Jan. 25-Feb. 5, 2021, pp. 1-2 (Year: 2021).*

R2-2100536, "General aspects for SL DRX", Jan. 25-Feb. 5, 2021, pp. 1-6 (Year: 2021).*

R2-2100514, "Definition of the Active Time in SL DRX", Jan. 2021, pp. 1-4 (Year: 2021).*

LG Electronics, "WID revision: NR sidelink enhancement", RP-202846, (revision of RP-202253), 3GPP TSG RAN Meeting #90e, Electronic Meeting, Dec. 7-11, 2020.

Vodafone, "New SID: Study on NR V2X", RP-181429, 3GPP TSG RAN Meeting #80, La Jolla, USA, Jun. 11-14, 2018.

Huawei et al., "New WID on 3GPP V2X Phase 2", RP-170798, (revision of RP-170724), 3GPP TSG RAN Meeting #75, Dubrovnik, Croatia, Mar. 6-9, 2017.

LG Electronics et al., "New WI proposal: Support for V2V services based on LTE sidelink", RP-152293, 3GPP TSG RAN Meeting #70, Sitges, Spain, Dec. 7-10, 2015.

Qualcomm Incorporated, "Work Item Proposal for Enhanced LTE Device to Device Proximity Services", RP-142311, 3GPP TSG RAN Meeting #66, Maui, USA, Dec. 8-11, 2014.

Qualcomm Incorporated, "Work item proposal on LTE Device to Device Proximity Services", RP-140518, 3GPP TSG RAN Meeting #63, Fukuoka, Japan, Mar. 3-6, 2014.

Moderator (Intel Corporation), "FL summary#2 of critical issues for 7.2.4.2.2—V2X Mode 2", R1-2004715, 3GPP TSG RAN WG1 Meeting #101-E, e-Meeting, May 25-Jun. 5, 2020.

Huawei et al., "Consideration on the Sidelink DRX for unicast", R2-2101762, 3GPP TSG-RAN WG2 Meeting #113-e, On-line, Jan. 25, 2021-Feb. 5, 2021, Jan. 15, 2021(Jan. 15, 2021), XP051974627.

CATT, "Sidelink DRX Timer Maintenance and Active Time Definition", R2-2100236, 3GPP TSG-RAN WG2 Meeting #113, Electronic, Jan. 25, 2021-Feb. 5, 2021, Jan. 15, 2021(Jan. 15, 2021), XP051973439.

Huawei, HiSilicon, "Consideration on the sidelink DRX for unicast, groupcast and broadcast", R2-2009413, 3GPP TSG-RAN WG2 Meeting #112 electronic, Nov. 2-13, 2020.

* cited by examiner

USER EQUIPMENT AND METHOD FOR HANDLING SIDELINK (SL) DISCONTINUOUS RECEPTION (DRX) ROUND TRIP TIME (RTT) TIMER

TECHNICAL FIELD

The present invention relates to the technical field of wireless communications, and in particular to a method performed by user equipment, and corresponding user equipment.

BACKGROUND

In conventional cellular networks, all communication needs to pass through base stations. By contrast, D2D communication (device-to-device communication) refers to a means of communication in which two user equipment units directly communicate with each other without needing to pass through a base station or needing a core network to perform forwarding therebetween. A research project on the use of LTE equipment to implement proximity D2D communication services was approved at the 3rd Generation Partnership Project (3GPP) RAN #63 plenary meeting in March 2014 (see Non-Patent Document 1). Functions introduced in the LTE Release 12 D2D include:

1) a discovery function between proximate devices in an LTE network coverage scenario;
2) a direct broadcast communication function between proximate devices; and
3) support for unicast and groupcast communication functions at higher layers.

A research project on enhanced LTE eD2D (enhanced D2D) was approved at the 3GPP RAN #66 plenary meeting in December 2014 (see Non-Patent Document 2). Main functions introduced in the LTE Release 13 eD2D include:

1) D2D discovery in out-of-coverage and partial-coverage scenarios; and
2) a priority handling mechanism for D2D communication.

Based on the design of the D2D communication mechanism, a V2X feasibility research project based on D2D communication was approved at the 3GPP RAN #68 plenary meeting in June 2015. V2X stands for Vehicle to Everything, and is used to implement information exchange between a vehicle and all entities that may affect the vehicle, for the purpose of reducing accidents, alleviating traffic congestion, reducing environmental pollution, and providing other information services. Application scenarios of V2X mainly include four aspects:

1) V2V, Vehicle to Vehicle, i.e., vehicle-to-vehicle communication;
2) V2P, Vehicle to Pedestrian, i.e., a vehicle transmits alarms to a pedestrian or a non-motorized vehicle;
3) V2N: Vehicle-to-Network, i.e., a vehicle connects to a mobile network;
4) V2I: Vehicle-to-Infrastructure, i.e., communication such as that between a vehicle and road infrastructure.

3GPP divides the research and standardization of V2X into three stages. The first stage was completed in September 2016, and mainly focused on V2V and was based on LTE Release 12 and Release 13 D2D (also known as sidelink), that is, the development of proximity communication technologies (see Non-Patent Document 3). V2X stage 1 introduced a new D2D communication interface referred to as a PC5 interface. The PC5 interface is mainly used to address the issue of cellular Internet of Vehicle (IoV) communication in high-speed (up to 250 km/h) and high-node density environments. Vehicles can exchange information such as position, speed, and direction through the PC5 interface, that is, the vehicles can communicate directly through the PC5 interface. Compared with the proximity communication between D2D devices, functions introduced in LTE Release 14 V2X mainly include:

1) higher density DMRS to support high-speed scenarios;
2) introduction of subchannels to enhance resource allocation methods; and
3) introduction of a user equipment sensing mechanism having semi-persistent scheduling.

The second stage of the V2X research project belonged to the LTE Release 15 research category (see Non-Patent Document 4). Main features introduced included high-order 64QAM modulation, V2X carrier aggregation, short TTI transmission, as well as feasibility study of transmit diversity.

The corresponding third stage, a V2X feasibility research project based on 5G NR network technologies (see Non-Patent Document 5), was approved at the 3GPP RAN #80 plenary meeting in June 2018.

In the 5G NR V2X project, user equipment sensing-based resource allocation mode 2, or referred to as transmission mode 2, is supported. In resource allocation mode 2, the physical layer of the user equipment senses transmission resources in a resource pool, and reports a set of available transmission resources to the upper layers. After acquiring the report from the physical layer, the upper layers select a specific resource for sidelink transmission.

A standardization study project based on standardized NR sidelink enhancement (see Non-Patent Document 6) was approved at the 3GPP RAN #90e plenary meeting in December 2020. The sidelink enhancement includes the following two aspects:

1) standard resource allocation modes for power consumption reduction (power saving) of sidelink user equipment include, but are not limited to: a resource allocation mode based on partial sensing, and a resource allocation mode based on random resource selection.
2) Research to improve communication reliability of resource allocation mode 2 in NR sidelink and reduction in communication latency of resource allocation mode 2.

The solution of the present patent includes a method performed by sidelink user equipment in sidelink enhancement to determine a candidate resource set in a resource allocation mode based on partial sensing, and a method performed by user equipment to determine a moment when an upper layer triggers the physical layer to perform partial sensing.

The study project of NR sidelink enhancement also includes the standardization study work of sidelink (SL) discontinuous reception (SL DRX). In 5G NR communication, user equipment supports temporally discontinuous reception of a physical downlink control channel (PDCCH), referred to as DRX, thereby effectively reducing power consumption of communication devices. Similarly, corresponding to SL DRX, discontinuous reception refers to receiving a physical sidelink control channel (PSCCH) within a partial time in the time domain, and the time is referred to as an active time. A time within which no PSCCH is received is referred to as an in-active time.

The solution of the present patent also includes a method performed by sidelink user equipment to determine the duration of a round trip time (RTT) timer.

PRIOR ART DOCUMENT

Non-Patent Documents

Non-Patent Document 1: RP-140518, Work item proposal on LTE Device to Device Proximity Services
Non-Patent Document 2: RP-142311, Work Item Proposal for Enhanced LTE Device to Device Proximity Services
Non-Patent Document 3: RP-152293, New WI proposal: Support for V2V services based on LTE sidelink
Non-Patent Document 4: RP-170798, New WID on 3GPP V2X Phase 2
Non-Patent Document 5: RP-181480, New SID Proposal: Study on NR V2X
Non-Patent Document 6: RP-202846, WID revision: NR sidelink enhancement

SUMMARY

An objective of the present invention is to provide a method performed by user equipment which can ensure that a PSSCH transmitted by sidelink user equipment is capable of being received by peer user equipment in an active time and can enhance sidelink reliability, and user equipment.

Another objective of the present invention is to provide a method performed by user equipment, allowing the solution of the present patent to be capable of ensuring that the user equipment is capable of continuously monitoring a PSCCH to avoid a resource conflict after partial sensing is triggered in a resource allocation mode based on partial sensing, and improving sidelink transmission reliability, and user equipment.

Yet another objective of the present invention is to provide a method in which user equipment in the present patent determines a round trip time timer thereby ensuring round trip time timer consistency between transmitting user equipment and receiving user equipment, a method performed by user equipment and capable of effectively reducing power consumption of sidelink user equipment, and user equipment.

In order to address at least part of the aforementioned issues, the present invention provides a method performed by user equipment, and user equipment.

According to a first aspect of the present invention, a request to determine a PSSCH/PSCCH transmission resource is received from a higher layer, and the user equipment determines a sidelink discontinuous reception active time, and determines a set of monitoring slots.

In the method performed by user equipment according to the first aspect of the present invention, the request to determine a PSSCH/PSCCH transmission resource is received from the higher layer in a slot n.

In the method performed by user equipment according to the first aspect of the present invention, the set of monitoring slots at least comprises slots in all or some resource pools within both a time interval and an active time, wherein the time interval is [n, n+TB] or [n+1, n+$T_B$], $T_B$ being the 31st slot counted from the slot n in the resource pool or being the $$\left(T^{SL}_{proc,1} + T^{SL}_{proc,0}\right)\text{-}th \text{ or } T^{SL}_{proc,1}\text{-}th$$

slot before the foregoing or being the slot obtained by subtracting $$\left(T^{SL}_{proc,1} + T^{SL}_{proc,0}\right) \text{ or } T^{SL}_{proc,1}$$

slots from the foregoing, or $T_B$ being the 32nd slot counted from the slot n in the resource pool or being the $$\left(T^{SL}_{Proc,1} + T^{SL}_{proc,0}\right)\text{-}th \text{ or } T^{SL}_{proc,1}\text{-}th$$

slot before the foregoing or being the slot obtained by subtracting $$\left(T^{SL}_{proc,1} + T^{SL}_{proc,0}\right) \text{ or } T^{SL}_{proc,1}$$

slots from the foregoing).

In the method performed by user equipment according to the first aspect of the present invention, a time interval is within the active time, wherein the time interval is [n, n+$T_B$] or [n+1, n+$T_B$], $T_B$ being the 31st slot counted from the slot n in the resource pool or being the $$\left(T^{SL}_{proc,1} + T^{SL}_{proc,0}\right)\text{-}th \text{ or } T^{SL}_{proc,1}\text{-}th$$

slot before the foregoing or being the slot obtained by subtracting $$\left(T^{SL}_{proc,1} + T^{SL}_{proc,0}\right) \text{ or } T^{SL}_{proc,1}$$

slots from the foregoing, or $T_B$ being the 32nd slot counted from the slot n in the resource pool or being the $$\left(T^{SL}_{proc,1} + T^{SL}_{proc,0}\right) - th \text{ or } T^{SL}_{proc,1} - th$$

slot before the foregoing or being the slot obtained by subtracting $$\left(T^{SL}_{proc,1} + T^{SL}_{proc,0}\right) \text{ or } T^{SL}_{proc,1}$$

slots from the foregoing).

According to a second aspect of the present invention, comprising: receiving, by first user equipment, time interval indication information transmitted by second user equipment, and determining, by the first user equipment, the duration of a round trip time timer of sidelink discontinuous reception.

In the method performed by user equipment according to the second aspect of the present invention, a time interval indicated by the time interval indication information represents a time, determined by the second user equipment, required for PSFCH reception processing and retransmission preparation.

In the method performed by user equipment according to the second aspect of the present invention, the first user equipment determines the duration of the round trip time timer of the sidelink discontinuous reception at least according to the time interval indication information.

According to a third aspect of the present invention, comprising: acquiring, by user equipment, sidelink resource pool configuration information, and determining, by the receiving user equipment, the duration of a round trip time timer of sidelink discontinuous reception.

In the method performed by user equipment according to the third aspect of the present invention, the sidelink resource pool configuration information at least comprises the minimum time domain interval sl-MinTimeGapPSFCH between a PSSCH and a PSFCH and a PSFCH period sl-PSFCH-Period.

User equipment according to a fourth aspect of the present invention comprises: a processor; and a memory storing instructions, wherein the instructions, when run by the processor, perform the method according to the first aspect.

Effect of Invention

According to the solution of the present patent, in the resource allocation mode based on partial sensing, it can be ensured that a PSSCH transmitted by sidelink user equipment is capable of being received by peer user equipment in an active time, thereby enhancing sidelink reliability. In addition, in the resource allocation mode based on partial sensing, the solution of the present patent can ensure that user equipment is capable of continuously monitoring a PSCCH to avoid a resource conflict after partial sensing is triggered, thereby improving sidelink transmission reliability. The method in the present patent in which user equipment determines a round trip time (RTT) timer ensures round trip time (RTT) timer consistency between transmitting user equipment and receiving user equipment, and can effectively reduce power consumption of sidelink user equipment.

BRIEF DESCRIPTION OF THE DRAWINGS

The above and other features of the present invention will be more apparent from the following detailed description in combination with the accompanying drawings, in which.

DETAILED DESCRIPTION

Figure 1:
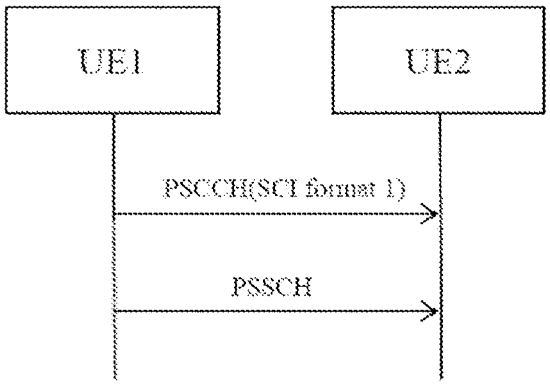
FIG. 1 is a schematic diagram showing sidelink communication of LTE V2X UE.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and later evolved versions thereof are used as exemplary application environments to set forth a plurality of embodiments according to the present invention in detail. However, it is to be noted that the present invention is not limited to the following embodiments, but is applicable to many other wireless communication systems, such as a communication system after 5G and a 4G mobile communication system before 5G.

Some terms involved in the present invention are described below. Unless otherwise specified, the terms used in the present invention use the definitions herein. The terms given in the present invention may vary in LTE, LTE-Advanced, LTE-Advanced Pro, NR, and subsequent communication systems, but unified terms are used in the present invention. When applied to a specific system, the terms may be replaced with terms used in the corresponding system.

3GPP: 3rd Generation Partnership Project
LTE: Long Term Evolution
NR: New Radio
PDCCH: Physical Downlink Control Channel
DCI: Downlink Control Information
PDSCH: Physical Downlink Shared Channel
UE: User Equipment
eNB: evolved NodeB, evolved base station
gNB: NR base station
TTI: Transmission Time Interval
OFDM: Orthogonal Frequency Division Multiplexing
CP-OFDM: Cyclic Prefix Orthogonal Frequency Division Multiplexing
C-RNTI: Cell Radio Network Temporary Identifier
CSI: Channel State Information
HARQ: Hybrid Automatic Repeat Request
CSI-RS: Channel State Information Reference signal
CRS: Cell Reference Signal
PUCCH: Physical Uplink Control Channel
PUSCH: Physical Uplink Shared Channel
UL-SCH: Uplink Shared Channel
CG: Configured Grant
Sidelink: Sidelink communication
SCI: Sidelink Control Information
PSCCH: Physical Sidelink Control Channel
MCS: Modulation and Coding Scheme
RB: Resource Block
RE: Resource Element
CRB: Common Resource Block
CP: Cyclic Prefix
PRB: Physical Resource Block
PSSCH: Physical Sidelink Shared Channel
FDM: Frequency Division Multiplexing
RRC: Radio Resource Control
RSRP: Reference Signal Receiving Power
SRS: Sounding Reference Signal
DMRS: Demodulation Reference Signal
CRC: Cyclic Redundancy Check
PSDCH: Physical Sidelink Discovery Channel
PSBCH: Physical Sidelink Broadcast Channel
SFI: Slot Format Indication
TDD: Time Division Duplexing
FDD: Frequency Division Duplexing
SIB1: System Information Block Type 1

SLSS: Sidelink Synchronization Signal
PSSS: Primary Sidelink Synchronization Signal
SSSS: Secondary Sidelink Synchronization Signal
PCI: Physical Cell ID
PSS: Primary Synchronization Signal
SSS: Secondary Synchronization Signal
BWP: Bandwidth Part
GNSS: Global Navigation Satellite System
SFN: System Frame Number (radio frame number)
DFN: Direct Frame Number
IE: Information Element
SSB: Synchronization Signal Block
EN-DC: EUTRA-NR Dual Connection
MCG: Master Cell Group
SCG: Secondary Cell Group
Pcell: Primary Cell
Scell: Secondary Cell
PSFCH: Physical Sidelink Feedback Channel
SPS: Semi-Persistent Scheduling
TA: Timing Advance
PT-RS: Phase-Tracking Reference Signal
TB: Transport Block
CB: Code Block
QPSK: Quadrature Phase Shift Keying
16/64/256 QAM: 16/64/256 Quadrature Amplitude Modulation
AGC: Automatic Gain Control
TDRA (field): Time Domain Resource Assignment indication (field)
FDRA (field): Frequency Domain Resource Assignment indication (field)
ARFCN: Absolute Radio Frequency Channel Number
SC-FDMA: Single Carrier-Frequency Division Multiple Access
MAC: Medium Access Control layer
DRX: Discontinuous Reception
RTT: Round Trip Time The following is a description of the prior art associated with the solution of the present invention. Unless otherwise specified, the same terms in the specific embodiments have the same meanings as in the prior art.

It is worth pointing out that the V2X and sidelink mentioned in the description of the present invention have the same meaning. The V2X herein can also mean sidelink; similarly, the sidelink herein can also mean V2X, and no specific distinction and limitation will be made in the following text.

The resource allocation mode of V2X (sidelink) communication and the transmission mode of V2X (sidelink) communication in the description of the present invention can equivalently replace each other. The resource allocation mode involved in the description can mean a transmission mode, and the transmission mode involved herein can mean a resource allocation mode. In NR sidelink, transmission mode 1 represents a base station scheduling-based transmission mode (resource allocation mode), and transmission mode 2 represents a user equipment sensing-based and resource selection-based transmission mode (resource allocation mode).

The PSCCH In the description of the present invention is used to carry SCI. The PSSCH associated with or relevant to or corresponding to or scheduled by PSCCH involved in the description of the present invention has the same meaning, and all refer to an associated PSSCH or a corresponding PSSCH. Similarly, the SCI (including first stage SCI and second stage SCI) associated with or relevant to or corresponding to PSSCH involved in the description has the same meaning, and all refer to associated SCI or corresponding SCI. It is worth pointing out that the first stage SCI, referred to as 1st stage SCI or SCI format 1-A, is transmitted in the PSCCH; and the second stage SCI, referred to as 2nd stage SCI or SCI format 2-A (or, SCI format 2-B), is transmitted in resources of the corresponding PSSCH.

In the description of the present invention, peer user equipment represents user equipment on the receiving side in sidelink unicast communication, i.e., receiving user equipment. Unicast communication means that a connection is established between one transmitting user equipment and one receiving user equipment, and the connection is referred to as a PC5 RRC connection. Upon establishment of the PC5 RRC connection, the transmitting user equipment may transmit a PC5 RRC configuration message to the receiving user equipment (the peer user equipment), and the receiving user equipment may also transmit a PC5 RRC configuration message to the transmitting user equipment, which is not limited in the present invention. When the receiving user equipment transmits a configuration message, a PSSCH, or a PSFCH to the transmitting user equipment, the transmitting user equipment may also be referred to as the peer user equipment.

In embodiments in the description of the present invention, a set of monitoring slots determined by user equipment may not include a slot in which the user equipment transmits a (PSSCH/PSCCH), which is not limited in the present invention.

Sidelink Communication Scenario

1) Out-of-coverage sidelink communication: both of two uEs performing sidelink communication are out of network coverage (for example, the UE cannot detect any cell that meets a "cell selection criterion" on a frequency at which sidelink communication needs to be performed, and that means the UE is out of network coverage).
2) In-coverage sidelink communication: both of two uEs performing sidelink communication are in network coverage (for example, the UE detects at least one cell that meets a "cell selection criterion" on a frequency at which sidelink communication needs to be performed, and that means the UE is in network coverage).
3) Partial-coverage sidelink communication: one of two uEs performing sidelink communication is out of network coverage, and the other is in network coverage.

From the perspective of the UE side, the UE only has two scenarios, out-of-coverage and in-coverage. Partial-coverage is described from the perspective of sidelink communication.

Basic Procedure of LTE V2X (Sidelink) Communication

FIG. 1 is a schematic diagram showing sidelink communication of LTE V2X UE. First, UE1 transmits to UE2 sidelink control information (SCI format 1), which is carried by a physical layer channel PSCCH. SCI format 1 includes scheduling information of a PSSCH, such as frequency domain resources and the like of the PSSCH. Secondly, UE1 transmits to UE2 sidelink data, which is carried by the physical layer channel PSSCH. The PSCCH and the corresponding PSSCH are frequency division multiplexed, that is, the PSCCH and the corresponding PSSCH are located in the same subframe in the time domain but are located on different RBs in the frequency domain. In LTE V2X, one transport block (TB) may include only one initial transmission, or include one initial transmission and one blind retransmission (indicating a retransmission not based on HARQ feedback).

Specific Design Methods of the PSCCH and the PSSCH are as Follows:

1) The PSCCH occupies one subframe in the time domain and two consecutive RBs in the frequency domain. Initialization of a scrambling sequence uses a pre-defined value of 510. The PSCCH may carry SCI format 1, wherein the SCI format 1 at least includes frequency domain resource information of the PSSCH. For example, for a frequency domain resource indication field, SCI format 1 indicates a starting sub-channel number and the number of consecutive sub-channels of the PSSCH corresponding to the PSCCH.
2) The PSSCH occupies one subframe in the time domain, and the PSSCH and the corresponding PSCCH are frequency division multiplexed (FDM). The PSSCH occupies one or a plurality of consecutive subchannels in the frequency domain. The subchannel represents $N_{subCHsize}$ consecutive RBs in the frequency domain, $N_{subCHsize}$ is configured by an RRC parameter, and a starting subchannel and the number of consecutive subchannels are indicated by a frequency domain resource indication field of the SCI format 1.

LTE V2X Resource Allocation Modes: Transmission Mode 3/Transmission Mode 4

Figure 2:
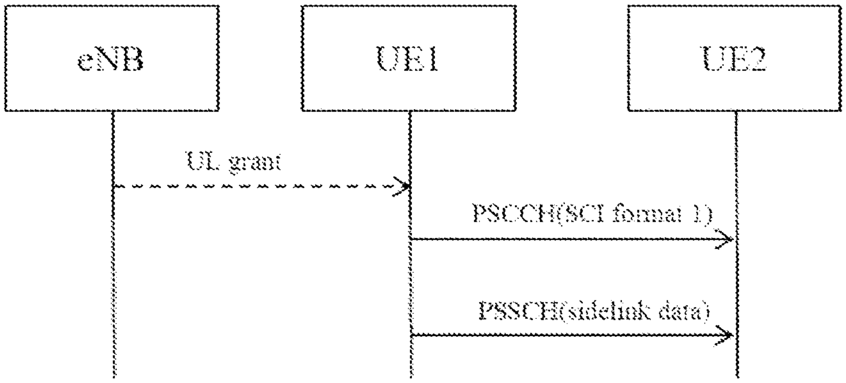
FIG. 2 is a schematic diagram showing a resource allocation mode of LTE V2X.

FIG. 2 shows two LTE V2X resource allocation modes, which are referred to as base station scheduling-based resource allocation (transmission mode 3) and UE sensing-based resource allocation (transmission mode 4), respectively. In NR sidelink, transmission mode 3 in LTE V2X corresponds to transmission mode 1 in NR V2X, and is a base station scheduling-based transmission mode, and transmission mode 4 in LTE V2X corresponds to transmission mode 2 in NR V2X, and is a UE sensing-based transmission mode. In LTE V2X, when there is eNB network coverage, a base station can configure, by means of UE-level dedicated RRC signaling SI-V2X-ConfigDedicated, a resource allocation mode of UE, which can alternatively be referred to as a transmission mode of the UE, which is specifically as follows:

1) Base station scheduling-based resource allocation mode (transmission mode 3): the base station scheduling-based resource allocation mode means that frequency domain resources used in sidelink communication are scheduled by the base station. Transmission mode 3 includes two scheduling modes, which are dynamic scheduling and semi-persistent scheduling (SPS), respectively. For dynamic scheduling, a UL grant (DCI format 5A) includes the frequency domain resources of the PSSCH, and a CRC of a PDCCH or an EPDCCH carrying the DCI format 5A is scrambled by an SL-V-RNTI. For SPS, the base station configures one or a plurality of (at most 8) configured grants through IF: SPS-ConfigSL-r14, and each configured grant includes a grant index and a resource period of the grant. The UL grant (DCI format 5A) includes the frequency domain resource of the PSSCH, indication information (3 bits) of the grant index, and indication information of SPS activation or release (or deactivation). The CRC of the PDCCH or the EPDCCH carrying the DCI format 5A is scrambled by an SL-SPS-V-RNTI.

Specifically, when RRC signaling SI-V2X-ConfigDedicated is set to scheduled-r14, same indicates that the UE is configured in the base station scheduling-based transmission mode. The base station configures the SL-V-RNTI or the SL-SPS-V-RNTI by means of RRC signaling, and transmits the UL grant to the UE by means of the PDCCH or the EPDCCH (DCI format 5A, the CRC is scrambled by the SL-V-RNTI or the SL-SPS-V-RNTI). The UL grant includes at least scheduling information of the PSSCH frequency domain resource in sidelink communication. When the UE successfully detects the PDCCH or the EPDCCH scrambled by the SL-V-RNTI or the SL-SPS-V-RNTI, the UE uses a PSSCH frequency domain resource indication field in the UL grant (DCI format 5A) as PSSCH frequency domain resource indication information in a PSCCH (SCI format 1), and transmits the PSCCH (SCI format 1) and a corresponding PSSCH.

For SPS in transmission mode 3, the UE receives, on a downlink subframe n, the DCI format 5A scrambled by the SL-SPS-V-RNTI. If the DCI format 5A includes the indication information of SPS activation, then the UE determines frequency domain resources of the PSSCH according to the indication information in the DCI format 5A, and determines time domain resources of the PSSCH (transmission subframes of the PSSCH) according to information such as the subframe n and the like.

2) UE sensing-based resource allocation mode (transmission mode 4): the UE sensing-based resource allocation mode means that resources used in sidelink communication are based on a procedure of sensing, by the UE, a candidate available resource set. When the RRC signaling SI-V2X-ConfigDedicated is set to ue-Selected-r14, it indicates that the UE is configured to be in a UE sensing-based transmission mode. In the UE sensing-based transmission mode, the base station configures an available transmission resource pool, and the UE determines a PSSCH sidelink transmission resource in the transmission resource pool according to a certain rule (for a detailed description of the procedure, see the LTE V2X UE sensing procedure section), and transmits a PSCCH (SCI format 1) and a corresponding PSSCH.

Sidelink Resource Pool

In sidelink, resources transmitted and received by UE all belong to resource pools. For example, for a base station scheduling-based transmission mode in sidelink, the base station schedules transmission resources for sidelink UE in a resource pool; alternatively, for a UE sensing-based transmission mode in sidelink, the UE determines a transmission resource in a resource pool.

Resource Allocation Mode Based on (Partial) Sensing

For a resource allocation mode based on (partial) sensing, sidelink user equipment selects a candidate resource within one time window, determines, according to a reserved resource indicated by a PSCCH transmitted by other user equipment in a monitoring slot, candidate resources overlapping with the reserved resource, and excludes the foregoing candidate resources overlapping with the reserved resource. The physical layer reports, to the MAC layer, a set of candidate resources that are not excluded, and the MAC layer selects a transmission resource for the PSSCH/PSCCH.

Physical Sidelink Feedback Channel (PSFCH)

In sidelink, the PSFCH is used to carry sidelink HARQ feedback (HARQ-ACK). For example, transmitting user equipment transmits a PSSCH and a PSCCH. If receiving user equipment correctly receives and decodes the PSCCH and the PSCCH, ACK is fed back on the PSFCH; otherwise, NACK is fed back.

Numerologies in NR (Including NR Sidelink) and Slots in NR (Including NR Sidelink)

A numerology includes two aspects: a subcarrier spacing and a cyclic prefix (CP) length. NR supports five subcarrier spacings, which are respectively 15 kHz, 30 kHz, 60 kHz, 120 kHz and 240 kHz (corresponding to μ=0, 1, 2, 3, 4). Table 4.2-1 shows the supported transmission numerologies specifically as follows:

TABLE 4.2-1

| Subcarrier Spacings Supported by NR | | |
|---|---|---|
| μ | $\Delta f = 2^{\mu} \cdot 15$ [KHz] | CP (cyclic prefix) |
| 0 | 15 | Normal |
| 1 | 30 | Normal |
| 2 | 60 | Normal, extended |
| 3 | 120 | Normal |
| 4 | 240 | Normal |

Only when μ=2, that is, in the case of a 60 kHz subcarrier spacing, is an extended CP supported, whereas only a normal CP is supported in the case of other subcarrier spacings. For the normal CP, each slot includes 14 OFDM symbols; for the extended CP, each slot includes 12 OFDM symbols. For μ=0, that is, a 15 kHz subcarrier spacing, one slot=1 ms; for μ=1, namely, a 30 kHz subcarrier spacing, one slot=0.5 ms; for μ=2, namely, a 60 kHz subcarrier spacing, one slot=0.25 ms, and so on.

NR and LTE have the same definition for a subframe, which denotes 1 ms. For a subcarrier spacing configuration u, a slot number in one subframe (1 ms) may be expressed as $$n_s^{\mu},$$

and ranges from 0 to $$N_{slot}^{subframe,\mu} - 1.$$

A slot number in one system frame (a duration of 10 ms) may be expressed as $$n_{s,f}^{\mu},$$

and ranges from 0 to $$N_{slot}^{frame,\mu} - 1.$$

Definitions of $$N_{slot}^{subframe,\mu}$$

and $$N_{slot}^{frame,\mu}$$

for different subcarrier spacings μ are shown in the tables below.

Table 4.3.2-1: the number of symbols included in each slot, the number of slots included in each system frame, and the number of slots included in each subframe for the normal CP

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4.3.2-2: the number of symbols included in each slot, the number of slots included in each system frame, and the number of slots included in each subframe for the extended CP (60 kHz)

| μ | $N_{symb}^{slot}$ | $N_{slot}^{frame,\mu}$ | $N_{slot}^{subframe,\mu}$ |
|---|---|---|---|
| 2 | 12 | 40 | 4 |

On an NR carrier, a system frame (or simply referred to as frame) number (SFN) ranges from 0 to 1023. The concept of a direct system frame number DFN is introduced to sidelink, and the number likewise ranges from 0 to 1023. The above description of the relationship between the system frame and the numerology can also be applied to a direct system frame. For example, the duration of one direct system frame is likewise equal to 10 ms; for a 15 kHz subcarrier spacing, one direct system frame includes 10 slots, and so on. The DFN is applied to timing on a sidelink carrier.

Parameter Sets in LTE (Including LTE V2X) and Slots in LTE (Including LTE V2X) and Subframes The LTE only supports a 15 kHz subcarrier spacing. Both the extended CP and the normal CP are supported in the LTE. The subframe has a duration of 1 ms and includes two slots. Each slot has a duration of 0.5 ms.

For a normal CP, each subframe includes 14 OFDM symbols, and each slot in the subframe includes 7 OFDM symbols; for an extended CP, each subframe includes 12 OFDM symbols, and each slot in the subframe includes 6 OFDM symbols.

Resource Block (RB), Resource Element (RE), and Sub-Channel

The resource block (RB) is defined in the frequency domain as $$N_{sc}^{RB} = 12$$

consecutive subcarriers. For example, for a 15 kHz subcarrier spacing, the RB is 180 kHz in the frequency domain. For a 15 kHz×$2^{\mu}$ subcarrier spacing, the resource element (RE) represents one subcarrier in the frequency domain and one OFDM symbol in the time domain.

In sidelink, the basic unit of the resource allocation of the PSSCH is the sub-channel. That is, the PSSCH transmission occupies one or a plurality of consecutive sub-channels in the frequency domain. One sub-channel represents a plurality of consecutive RBs in the frequency domain. The number of RBs included in one sub-channel is configured by means of RRC configuration information of the resource pool.

Sidelink Discontinuous Reception (SL DRX) and Round Trip Time (RTT) Timer

For SL DRX, sidelink user equipment monitors the PSCCH within an active time. User equipment does not need to monitor the PSCCH within an in-active time.

In SL DRX, user equipment determines whether a current time is an active time or an in-active time by means of some timers (running or expiring). For the round trip time (RTT) timer, it is indicated that when the timer is running, user equipment considers that peer user equipment is not to transmit a PSCCH to schedule retransmission or other sidelink transmission, so that before the RTT timer expires, the user equipment is in the in-active time, and does not monitor the PSCCH. The RTT timer generally represents a minimum duration assumed by the user equipment within which peer user equipment will not schedule retransmission.

In the description of the present invention, expiration of a timer indicates that a running time of the timer exceeds the duration of the timer, i.e., referred to as that the timer expires.

Resource Selection Window [n+T1, n+T2]

In a resource allocation mode based on sensing (or, partial sensing), a higher layer requests or triggers, in a slot n, the physical layer to determine a resource for PSSCH/PSCCH transmission. The resource selection window is defined as [n+T1, n+T2]. That is, user equipment selects a transmission resource within the foregoing window. T1 satisfies the condition $$0 \leq T1 \leq T^{SL}_{proc,1},$$

and the selection of T1 is up to user equipment implementation. RRC configuration information includes a resource selection window configuration list sl-SelectionWindow List, and an element on the list and corresponding to a given priority priorx (a priority of transmitting the PSSCH) is represented by $T_{2\ min}$. If $T_{2\ min}$ is less than a remaining packet delay budget (PDB), T2 satisfies the condition $T_{2\ min} \leq T2 \leq$ remaining PDB, and the selection of T2 is up to user equipment implementation; otherwise, T2 is set to the remaining PDB.

$$T^{SL}_{proc,1}$$

is defined as follows ($\mu_{SL}$ represents a sidelink subcarrier spacing parameter, that is, the subcarrier spacing is $2^{\mu_{SL}} \times 15$ kHz)

TABLE 8.1.4-2

| Values of $T_{proc,\ 1}^{SL}$ | |
|---|---|
| $\mu_{SL}$ | $T_{proc,\ 1}^{SL}$ [slots] |
| 0 | 3 |
| 1 | 5 |
| 2 | 9 |
| 3 | 17 |

TABLE 8.1.4-1

| Values of $T_{proc,\ 0}^{SL}$ | |
|---|---|
| $\mu_{SL}$ | $T_{proc,\ 0}^{SL}$ [slots] |
| 0 | 1 |
| 1 | 1 |
| 2 | 2 |
| 3 | 4 |

Hereinafter, specific examples and embodiments related to the present invention are described in detail. In addition, as described above, the examples and embodiments described in the present disclosure are illustrative descriptions for facilitating understanding of the present invention, rather than limiting the present invention.

Embodiment 1

Figure 3:
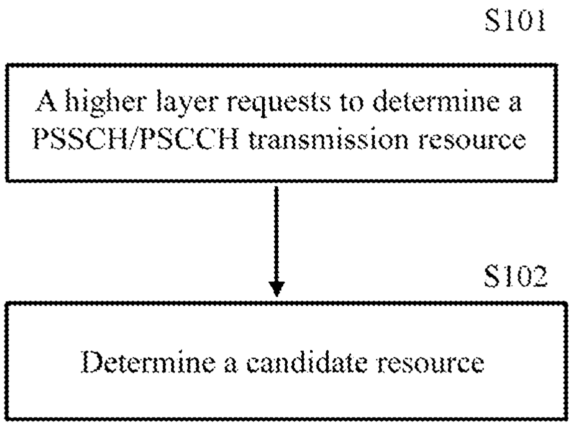
FIG. 3 is a schematic diagram showing a basic procedure of a method performed by user equipment according to Embodiment 1 of the invention.

FIG. 3 is a schematic diagram showing a basic procedure of a method performed by user equipment according to Embodiment 1 of the present invention.

The method performed by user equipment according to Embodiment 1 of the present invention is described in detail below in conjunction with the basic procedure diagram shown in FIG. 3.

As shown in FIG. 3, in Embodiment 1 of the present invention, the steps performed by user equipment include the following:

in step S101, receiving, from a higher layer (or an upper layer), a request (or a trigger) to determine a PSSCH/PSCCH transmission resource.

Optionally, the higher layer requests, in a slot n, the user equipment to determine the PSSCH/PSCCH transmission resource.

Optionally, the higher layer (the physical layer) provides a parameter for the PSSCH/PSCCH transmission.

Optionally, the parameter for the PSSCH/PSCCH transmission at least includes the number $L_{subCH}$ of subchannels for the PSSCH/PSCCH transmission.

In step S102, determining, by the sidelink user equipment, candidate resources.

Optionally, a candidate single-slot resource is defined as a set of $L_{subCH}$ consecutive subchannels in one slot $$t'^{SL}_{y}$$

in a resource pool, and optionally, the user equipment considers (or, assumes) that in a time interval [n+T1, n+T2] and/or a sidelink discontinuous reception (SL DRX) active time, any set of $L_{subCH}$ consecutive subchannels included (in any slot) in the resource pool corresponds to one candidate single-slot resource. T1 and T2 are both determined depending on the specific implementation of the user equipment, or [n+T1, n+T2] represents a resource selection window. The present embodiment does not impose any limitation on the foregoing.

Embodiment 2

Figure 4:
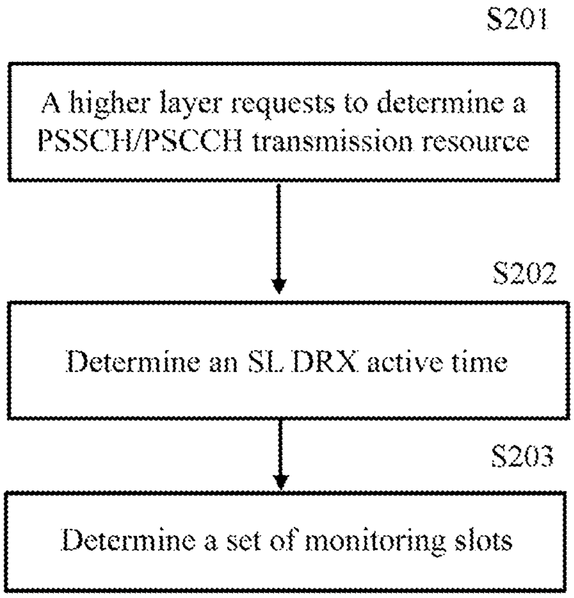
FIG. 4 is a schematic diagram showing a basic procedure of a method performed by user equipment according to Embodiments 2 and 3 of the invention.

FIG. 4 is a schematic diagram showing a basic procedure of a method performed by user equipment according to Embodiment 2 of the present invention.

The method performed by user equipment according to Embodiment 2 of the present invention is described in detail below in conjunction with the basic procedure diagram shown in FIG. 4.

As shown in FIG. 4, in Embodiment 2 of the present invention, the steps performed by user equipment include the following:

in step S201, receiving, from a higher layer (or an upper layer), a request (or a trigger) to determine a PSSCH/PSCCH transmission resource.

Optionally, the higher layer requests, in a slot n, the user equipment to determine the PSSCH/PSCCH transmission resource.

Optionally, the higher layer (the physical layer) provides a parameter for the PSSCH/PSCCH transmission.

In step S202, determining, by the sidelink user equipment, a sidelink discontinuous reception (SL DRX) active time.

In step S203, determining, by the sidelink user equipment, a set of monitoring slots.

Optionally, the set of monitoring slots at least includes slots in all or some resource pools within [n, n+$T_B$] (or [n+1, n+$T_B$]), and optionally the time interval [n, n+$T_B$] (or [n+1, n+$T_B$]) at least satisfies the condition: [n, n+$T_B$] (or [n+1, n+$T_B$]) is within the SL DRX active time. Optionally, $T_B$ is the 31st slot counted from the slot n in the resource pool (or the $$\left(T^{SL}_{proc,1}+T^{SL}_{proc,0}\right)-th \text{ or } T^{SL}_{proc,1}-th$$

slot before the foregoing, or the slot obtained by subtracting $$\left(T^{SL}_{proc,1}+T^{SL}_{proc,0}\right) \text{ or } T^{SL}_{proc,1}$$

slots from the foregoing), or $T_B$ is the 32nd slot counted from the slot n in the resource pool (or the $$\left(T^{SL}_{proc,1}+T^{SL}_{proc,0}\right)-th \text{ or } T^{SL}_{proc,1}-th$$

slot before the foregoing, or the slot obtained by subtracting $$\left(T^{SL}_{proc,1}+T^{SL}_{proc,0}\right) \text{ or } T^{SL}_{proc,1}$$

slots from the foregoing), n being a natural number.

Embodiment 3

FIG. 4 is a schematic diagram showing a basic procedure of a method performed by user equipment according to Embodiment 3 of the present invention.

The method performed by user equipment according to Embodiment 3 of the present invention is described in detail below in conjunction with the basic procedure diagram shown in FIG. 4.

As shown in FIG. 4, in Embodiment 3 of the present invention, the steps performed by the user equipment include:

in step S201, receiving, from a higher layer (or an upper layer), a request (or a trigger) to determine a PSSCH/PSCCH transmission resource.

Optionally, the higher layer requests, in a slot n, the user equipment to determine the PSSCH/PSCCH transmission resource.

Optionally, the higher layer (the physical layer) provides a parameter for the PSSCH/PSCCH transmission.

In step S202, optionally, determining, by the sidelink user equipment, a sidelink discontinuous reception (SL DRX) active time.

In step S203, determining, by the sidelink user equipment, a set of monitoring slots.

Optionally, the set of monitoring slots at least includes slots in all or some resource pools within both a time interval [n, n+$T_B$] (or [n+1, n+$T_B$]) and the SL DRX active time. Optionally, $T_B$ is the 31st slot counted from the slot n in the resource pool (or the $$\left(T^{SL}_{proc,1}+T^{SL}_{proc,0}\right)\text{-}th \text{ or } T^{SL}_{proc,1}\text{-}th$$

slot before the foregoing, or the slot obtained by subtracting $$\left(T^{SL}_{proc,1}+T^{SL}_{proc,0}\right) \text{ or } T^{SL}_{proc,1}$$

slots from the foregoing), or $T_B$ is the 32nd slot counted from the slot n in the resource pool (or the $$\left(T^{SL}_{proc,1}+T^{SL}_{proc,0}\right)\text{-}th \text{ or } T^{SL}_{proc,1}\text{-}th$$

slot before the foregoing, or the slot obtained by subtracting $$\left(T^{SL}_{proc,1}+T^{SL}_{proc,0}\right) \text{ or } T^{SL}_{proc,1}$$

slots from the foregoing), n being a natural number.

Embodiment 4

Figure 5:
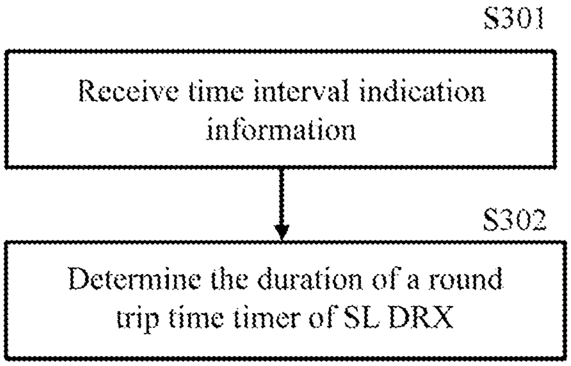
FIG. 5 is a schematic diagram showing a basic procedure of a method performed by user equipment according to Embodiment 4 of the invention.

FIG. 5 is a schematic diagram showing a basic procedure of a method performed by user equipment according to Embodiment 4 of the present invention.

The method performed by user equipment according to Embodiment 4 of the present invention is described in detail below in conjunction with the basic procedure diagram shown in FIG. 5.

As shown in FIG. 5, in Embodiment 4 of the present invention, the steps performed by the user equipment include:

in step S301, receiving, by first sidelink user equipment, time interval indication information transmitted by second sidelink user equipment.

Optionally, the second user equipment transmits the time interval indication information by means of PC5 RRC signaling or SCI.

Optionally, a time interval indicated by the time interval indication information represents a time, determined by the second user equipment, required for PSFCH reception processing and retransmission preparation (including channel multiplexing, transmission/reception switching, and reception/transmission switching).

Optionally, the time interval is determined up to the specific implementation of the second sidelink user equipment.

Optionally, communication between the first user equipment and the second user equipment is unicast communication.

In step S302, determining, by the first user equipment, the duration of a round trip time (RTT) timer of sidelink discontinuous reception (SL DRX).

Optionally, the duration of the round trip time (RTT) timer is at least based on the time interval, and/or a configured (or pre-configured) minimum time domain interval sl-MinTimeGapPSFCH between a PSSCH and a PSFCH, and/or a configured (or pre-configured) PSFCH period sl-PSFCH-Period.

Embodiment 5

Figure 6:
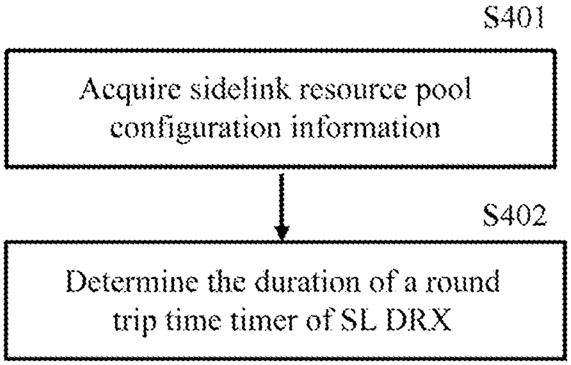
FIG. 6 is a schematic diagram showing a basic procedure of a method performed by user equipment according to Embodiment 5 of the invention.

FIG. 6 is a schematic diagram showing a basic procedure of a method performed by user equipment according to Embodiment 5 of the present invention.

The method performed by user equipment according to Embodiment 5 of the present invention is described in detail below in conjunction with the basic procedure diagram shown in FIG. 6.

As shown in FIG. 6, in Embodiment 5 of the present invention, the steps performed by the user equipment include:

in step S401, acquiring, by sidelink user equipment, sidelink resource pool configuration information.

Optionally, the sidelink resource pool configuration information at least includes a minimum time domain interval sl-MinTimeGapPSFCH between a PSSCH and a PSFCH and a PSFCH period sl-PSFCH-Period.

In step S402, determining, by the receiving user equipment, the duration of a round trip time (RTT) timer of sidelink discontinuous reception (SL DRX).

Optionally, the duration of the round trip time (RTT) timer is equal to the minimum value of time required by user equipment for PSFCH reception processing and retransmission preparation (including channel multiplexing, transmission/reception switching, and reception/transmission switching), or the duration of the round trip time (RTT) timer is equal to the sum of the minimum value of the time required by user equipment for PSFCH reception processing and retransmission preparation (including channel multiplexing, transmission/reception switching, and reception/transmission switching) and a time interval. The time interval is at least based on the minimum time domain interval sl-MinTimeGapPSFCH between the PSSCH and PSFCH and the PSFCH period sl-PSFCH-Period.

Embodiment 6

Figure 7:
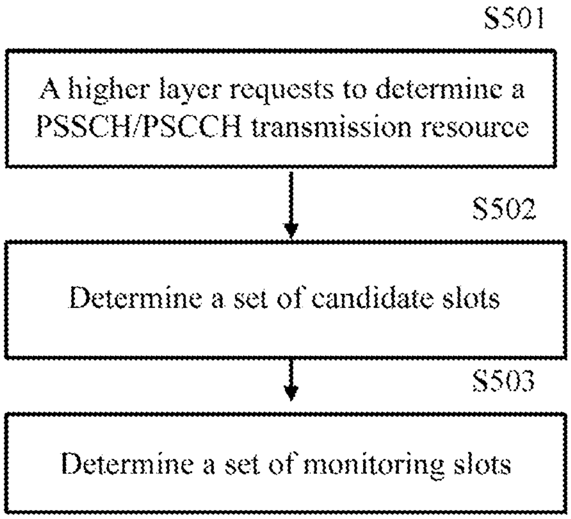
FIG. 7 is a schematic diagram showing a basic procedure of a method performed by user equipment according to Embodiments 6 and 7 of the invention.

FIG. 7 is a schematic diagram showing a basic procedure of a method performed by user equipment according to Embodiment 6 of the present invention.

The method performed by user equipment according to Embodiment 6 of the present invention is described in detail below in conjunction with the basic procedure diagram shown in FIG. 7.

As shown in FIG. 7, in Embodiment 6 of the present invention, steps performed by the user equipment include:

in step S501, requesting (or triggering), by a higher layer (or an upper layer), sidelink user equipment (the physical layer) to determine a PSSCH/PSCCH transmission resource.

Optionally, the higher layer requests, in a slot n, the user equipment to determine the PSSCH/PSCCH transmission resource.

In step S502, determining, by the sidelink user equipment, a set of candidate slots.

Optionally, a means used by the user equipment to determine the set of candidate slots is up to user equipment (UE) implementation.

In step S503, determining, by the sidelink user equipment, a set of monitoring slots.

Optionally, if the time of the 31st or 32nd resource pool slot before the slot $$t'^{SL}_{y}$$

or the slot $$t'^{SL}_{y} - T^{SL}_{proc,1}$$

or the slot $$t'^{SL}_{y} - \left(T^{SL}_{proc,1} + T^{SL}_{proc,0}\right)$$

is later than or equal to the slot n, the set of monitoring slots, in which the user equipment shall perform or performs monitoring, at least includes slots between the slot $$t'^{SL}_{y}$$

or the slot $$t'^{SL}_{y} - T^{SL}_{proc,1}$$

or the slot $$t'^{SL}_{y} - \left(T^{SL}_{proc,1} + T^{SL}_{proc,0}\right)$$

and the 31st or 32nd resource pool slot therebefore, and/or slots in all or some resource pools with which sidelink discontinuous reception (SL DRX) active times overlap.

Optionally, if the time of the 31st or 32nd resource pool slot before the slot $$t'^{SL}_{y}$$

or the slot $$t'^{SL}_{y} - T^{SL}_{proc,1}$$

or the slot $$t'^{SL}_{y} - \left(T^{SL}_{proc,1} + T^{SL}_{proc,0}\right)$$

is earlier than the slot n, the set of monitoring slots, in which the user equipment shall perform or performs monitoring, at least includes slots between the slot $$t_y'^{SL}$$

or the slot $$t_y'^{SL} - T_{proc,1}^{SL}$$

or the slot $$t_y'^{SL} - \left(T_{proc,1}^{SL} + T_{proc,0}^{SL}\right)$$

and the slot n, and/or slots in all or some resource pools with which sidelink discontinuous reception (SL DRX) active times overlap.

$$t_y'^{SL}$$

is any slot, e.g., the first or the last slot, in the set of candidate slots, and the present invention does not set any limitations on the foregoing.

Embodiment 7

FIG. 7 is a schematic diagram showing a basic procedure of a method performed by user equipment according to Embodiment 7 of the present invention.

The method performed by user equipment according to Embodiment 7 of the present invention is described in detail below in conjunction with the basic procedure diagram shown in FIG. 7.

As shown in FIG. 7, in Embodiment 7 of the present invention, steps performed by the user equipment include:

in step S501, requesting (or triggering), by a higher layer (or an upper layer), sidelink user equipment (the physical layer) to determine a PSSCH/PSCCH transmission resource.

Optionally, the higher layer requests, in a slot n, the user equipment to determine the PSSCH/PSCCH transmission resource.

In step S502, determining, by the sidelink user equipment, a set of candidate slots.

Optionally, a means used by the user equipment to determine the set of candidate slots is up to user equipment (UE) implementation.

In step S503, determining, by the sidelink user equipment, a set of monitoring slots.

Optionally, if the time of the 31st or 32nd resource pool slot before the slot $$t_y'^{SL}$$

or the slot $$t_y'^{SL} - T_{proc,1}^{SL}$$

or the slot $$t_y'^{SL} - \left(T_{proc,1}^{SL} + T_{proc,1}^{SL}\right)$$

is later than or equal to the slot n, slots in all or some resource pools between the slot $$t_y'^{SL}$$

or the slot $$t_y'^{SL} - T_{proc,1}^{SL}$$

or the slot $$t_y'^{SL} - \left(T_{proc,1}^{SL} + T_{proc,0}^{SL}\right)$$

and the 31st or 32nd resource pool slot therebefore belong to a sidelink discontinuous reception (SL DRX) active time. Optionally, if the time of the 31st or 32nd resource pool slot before the slot $$t_y'^{SL}$$

or the slot $$t_y'^{SL} - T_{proc,1}^{SL}$$

or the slot $$t_y'^{SL} - \left(T_{proc,1}^{SL} + T_{proc,0}^{SL}\right)$$

is earlier than the slot n, slots in all or some resource pools between the slot $$t_y'^{SL}$$

or the slot $$t_y'^{SL} - T_{proc,1}^{SL}$$

or the slot $$t_y'^{SL} - \left(T_{proc,1}^{SL} + T_{proc,0}^{SL}\right)$$

and the slot n belong to a sidelink discontinuous reception (SL DRX) active time.

$t_y'^{SL}$ is any slot, e.g., the first or the last slot, in the set of candidate slots, and the present invention does not set any limitations on the foregoing.

Figure 8:
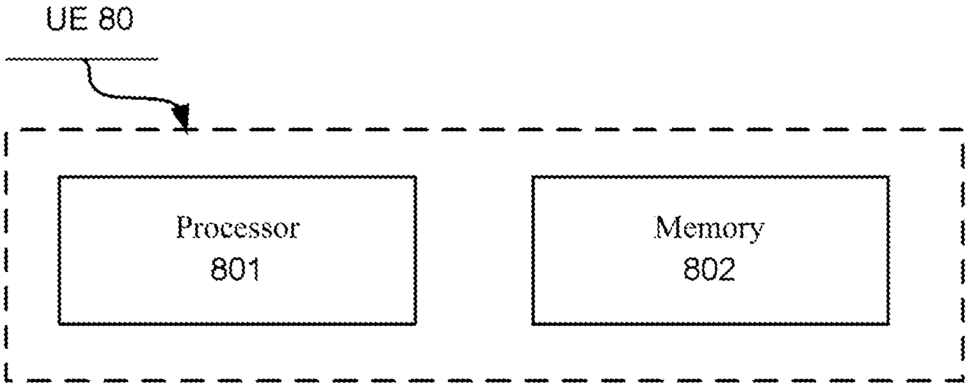
FIG. 8 is a block diagram showing user equipment according to an embodiment of the present invention.

FIG. 8 shows a block diagram of user equipment (UE) according to the present invention. As shown in FIG. 8, user equipment (UE) 80 includes a processor 801 and a memory 802. The processor 801 may include, for example, a microprocessor, a microcontroller, an embedded processor, and the like. The memory 802 may include, for example, a volatile memory (such as a random access memory (RAM)), a hard disk drive (HDD), a non-volatile memory (such as a flash memory), or other memories. The memory 802 stores program instructions. The instructions, when run by the processor 801, can implement the above method performed by user equipment as described in detail in the present invention.

The method and related equipment according to the present invention have been described above in combination with preferred embodiments. It should be understood by those skilled in the art that the method shown above is only exemplary, and the above embodiments can be combined with one another as long as no contradiction arises. The method of the present invention is not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant for limiting the present invention. The present invention is not limited to specific information elements serving as examples of these identifiers. A person skilled in the art could make various alterations and modifications according to the teachings of the illustrated embodiments.

It should be understood that the above-described embodiments of the present invention may be implemented by software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application-specific integrated circuit (ASIC), a field-programmable gate array (FPGA), a complex programmable logic device (CPLD), and the like.

In the present application, the "base station" may refer to a mobile communication data and control exchange center having large transmission power and a wide coverage area, including functions such as resource allocation and scheduling and data reception and transmission. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (the method) described in the embodiments of the present invention. Such setting of the present invention is typically provided as software, codes and/or other data structures provided or encoded on the computer-readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application-specific integrated circuits (ASICs) or general-purpose integrated circuits, field-programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A user equipment, comprising:

at least one processor; and at least one non-transitory machine-readable medium coupled to the at least one processor and storing one or more computer-executable instructions that, when executed by the at least one processor, cause the user equipment to:

receive sidelink control information (SCI); and determine a value of a sidelink (SL) discontinuous reception (SL DRX) round trip time (RTT) timer based on at least a time interval indicated in the received SCI, wherein the SL DRX RTT timer runs for a duration based on the determined value, and while the SL DRX RTT timer is running, the user equipment does not monitor a physical sidelink control channel (PSCCH).

2. A method performed by a user equipment (UE), the method comprising:

receiving sidelink control information (SCI); and determining a value of a sidelink (SL) discontinuous reception (SL DRX) round trip time (RTT) timer based on at least a time interval indicated in the received SCI, wherein the SL DRX RTT timer runs for a duration based on the determined value, and while the SL DRX RTT timer is running, the user equipment does not monitor a physical sidelink control channel (PSCCH).

* * * * *